Nov. 11, 1941.                    W. G. NOACK                    2,262,195
                    HOT GAS PRODUCING AND CONSUMING PLANT
                              Filed May 25, 1938
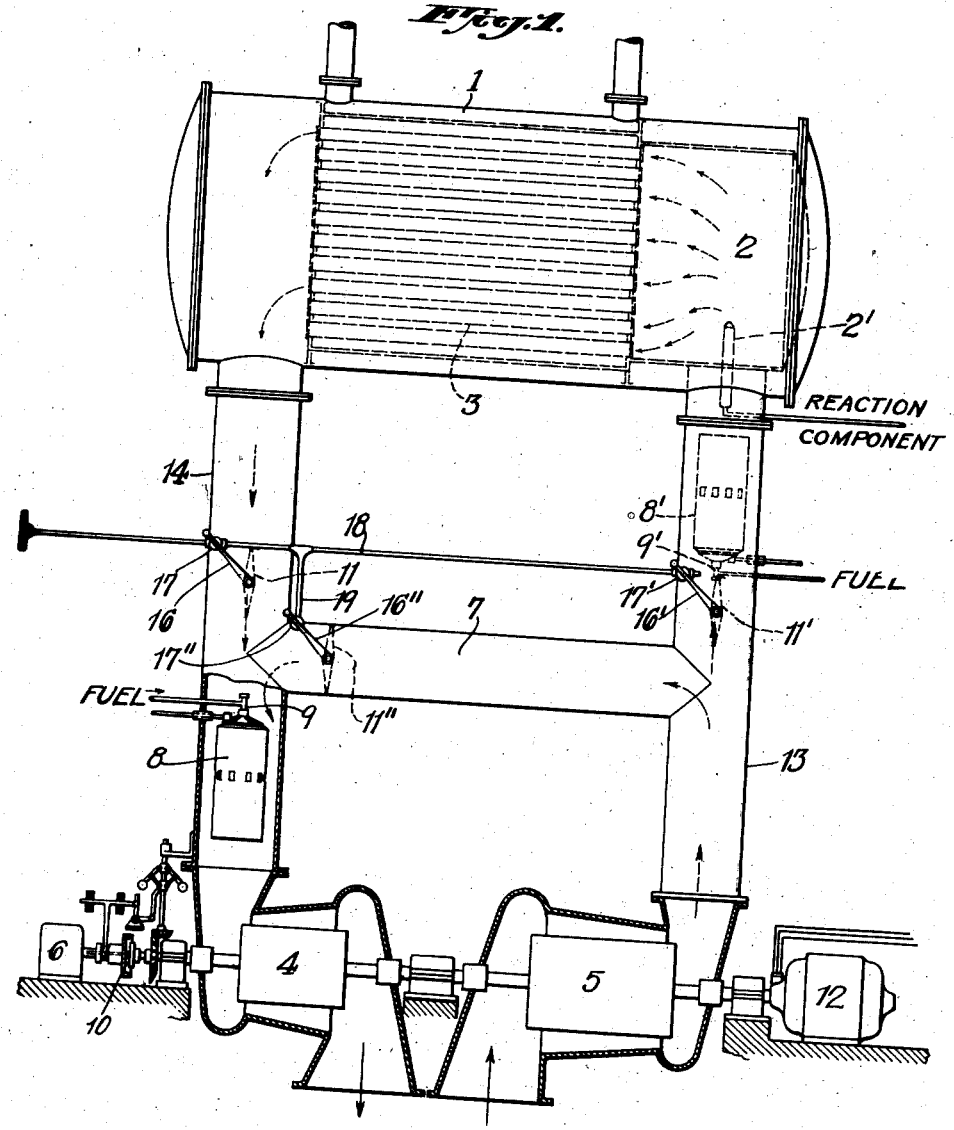
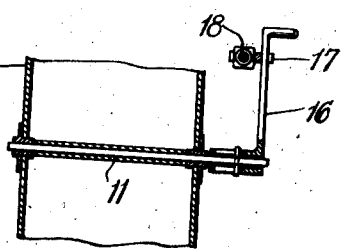
INVENTOR
WALTER GUSTAV NOACK.
BY
ATTORNEY Patented Nov. 11, 1941

2,262,195

UNITED STATES PATENT OFFICE 2,262,195

HOT GAS PRODUCING AND CONSUMING PLANT

Walter Gustav Noack, Baden, Switzerland, assignor to Aktiengesellschaft Brown, Boveri & Cie., Baden, Switzerland Application May 25, 1938, Serial No. 209,906
In Germany December 10, 1936

6 Claims. (Cl. 158—1)

The present application relates to a system for operating combustion chambers, furnaces or ovens for carrying out chemical reactions, and heat transfer plants which the gases produced in have the character of exhaust gases and serve not only a heat consumer which may be integral with said combustion chamber, chemical reaction chamber and the like, but are also utilized in another heat consumer which may be a separate and different piece of equipment in which the means according to my present invention maintain desired operating conditions at any operating condition of said combustion or reaction chamber and heat consumer associated therewith.

The present application is a continuation in part of my copending application Ser. No. 174,640, filed November 15, 1937.

It is an object of the present invention to provide means for starting up heat consuming plants and more particularly for supercharging chemical reaction plants.

It is an object of the present invention to provide means for slowly and gradually raising the temperature in furnaces and chemical reaction chambers.

It is an object of the present invention to provide means for the efficient operation of waste heat consumers whereby the heat supply to said consumers is made substantially independent of the operation of the producer of the waste heat.

It is an object of the present invention to provide a means for preheating the combustion material or reactant for operating a combustion or chemical reaction chamber.

Further and other objects of the present invention will be hereinafter set forth in the accompanying specification and claims and shown in the drawing which, by way of illustration, shows what I now consider to be a preferred embodiment of my invention.

In the drawing:

Fig. 1 is a diagrammatic illustration of a layout of a plant for carrying out the method according to the present invention.

Figure 2 is a detail of the plant shown in Fig. 1.

Referring more particularly to the drawing, 1 is a heat generator and consumer or chemical apparatus having a combustion or reaction chamber 2 into which a combustion material or reactant is introduced by means of the burner 2'. The heat produced in chamber 2 may be transmitted to another medium in the heat exchanger 3. The heat transfer is not complete and the products of combustion or other heat producing reaction in chamber 2, after having passed through heat exchanger 3, enter through conduit 14 the gas turbine 4 at high temperature where they produce power due to their pressure and temperature. This power is used for operating a blower or compressor 5 which is connected with chamber 2 by means of conduit 13 and produces the pressure needed in chamber 2. Excess power is used for operating the electric generator 12 for producing electric power for outside use. Generator 12 may be designed to also operate as a motor for driving blower 5 when there is not sufficient power available from turbine 4, for example, when starting up the plant. A special starting motor 6 might be provided for putting the plant in operation.

If the plant described above is started by just starting the charging unit 4, 5 by means of a motor 6 and, for example, starting combustion in chamber 2, the gas turbine 4 would only slowly be brought up to full speed because the large masses of the apparatus 1 would readily and almost completely absorb the small amount of heat developed at low speed of the compressor 5 and the gases leaving the apparatus 1 would reach the gas turbine 4 at low temperature.

According to the present invention a by-pass is provided in the form of a conduit 7 which connects conduits 13 and 14. In conduit 14 an auxiliary combustion chamber 8 is provided. Very little combustion medium, for example, combustion air, is needed to start combustion in chamber 8 and obtain hot gases for operating the gas turbine 4. Fuel may be supplied to chamber 8 through a nozzle 9. The charging unit 4, 5 is rapidly brought up to full speed and output by means of the auxiliary motor 6 and the quickly increasing output of the gas turbine 4 which is directly operated by the gases produced in chamber 8. Motor 6 is disconnected before the unit 4, 5 has reached full speed. This may be done by hand or automatically by means of a clutch 10 which disconnects motor 6 from turbine 4 when the latter reaches full speed.

During the starting up operation valves 11 and 11' in conduits 14 and 13 respectively are closed and valve 11" in conduit 7 is open.

When sufficient power is available from turbine 4 an additional combustion chamber 8' having a burner 9' and situated in conduit 13 between valve 11' and main combustion chamber 2 is started and valves 11 and 11' are gradually opened and valve 11" gradually closed. Valves 11, 11' and 11" may, for this purpose be interconnected by link means which comprise rods 18 and 19 and which allow also independent operation of said valves. For the latter operation the cranks 16, 16' and 16" are pulled somewhat outwards or to the right, as seen on Fig. 2, so that the crank arms are removed from the forks 17, 17' and 17" which are revolvably connected with the link rods 18 and 19 respectively.

With the heat produced in combustion chamber 8', chamber 2 and heat exchanger 3 are warmed up which can be done very gradually if the process to be carried out in apparatus 1 requires gradual heating up to a desired temperature.

Combustion in chamber 2 is then started and combustion chambers 8' and 2 may be operated in tandem combination until chamber 2 provides all heat required. Then combustion in chambers 8 and 8' may be stopped. Operation of combustion chamber 8' may be continued and serve for preheating the combustion material or reactant, such as combustion air, supplied by blower 5.

If the heat required for operating the heat consumer 3 is so much that the heat in the gases emerging from apparatus 1 is not sufficient for operating turbine 4 and producing all the power required by blower 5 and generator 12 combustion is maintained in chamber 8 which then additionally produces heat.

When the gases coming from apparatus 1 and passing through conduit 14 towards turbine 4 have attained full temperature they may be too hot for the burner 9 which naturally is a sensitive piece of equipment and should not be exposed continuously to too high temperatures. For this reason I preferably use in combination with the arrangement shown in the present application a combustion chamber into which the burner extends and which can be closed against the stream of hot gases so that the burner is not exposed thereto. The hot gases pass along the outside of the combustion chamber in the annular space between conduit 14 and chamber 8. A suitable combustion chamber and burner construction is disclosed in my copending applications Ser. No. 174,640, filed November 15, 1937, and Ser. No. 209,907, filed May 25, 1938.

While I believe the above described embodiments of my invention to be preferred embodiments, I wish it to be understood that I do not desire to be limited to the exact details of design and construction shown and described, for obvious modifications will occur to a person skilled in the art.

I claim:

1. A heat producing and consuming plant comprising a hot gas producer and a heat consumer directly associated therewith, a gas turbine, a blower connected with and operated by said turbine for supplying air to said gas producer, a gas conduit interconnecting said gas producer and said gas turbine, a combustion chamber disposed in said conduit, a second conduit interconnecting said blower and said combustion chamber and by-passing said gas producer, and valve means disposed in said second conduit for controlling the supply of air to said combustion chamber.

2. A heat producing and consuming plant comprising a hot gas producer and a heat consumer directly associated therewith, a gas turbine, a blower supplying air to said gas producer and being connected with and operated by said turbine, a conduit interconnecting said gas producer and said turbine, a combustion chamber disposed in said conduit, a second conduit interconnecting said blower and said combustion chamber and by-passing said gas producer, and valve means individually disposed in the path of the air supplied to said gas producer and in said second conduit, operating means individually connected with said valve means for individual operation thereof, and interlinking means interconnecting all said valve means for simultaneous operation of said valve means.

3. In a hot gas producing and consuming plant, a gas producer, an air blower, a gas turbine operatively connected with and operating said air blower, an air conduit interconnecting said blower and said gas producer for supplying compressed air thereto, an auxiliary combustion chamber disposed within said air conduit for heating the compressed air in said conduit, a gas conduit interconnecting said gas producer and said gas turbine for supplying operating gas thereto, a conduit interconnecting said air conduit and said gas conduit, and a valve means in each of said conduits for controlling the gas and air flow in said conduits.

4. In a hot gas producing and consuming plant, a gas producer, an air blower, a gas turbine operatively connected with and operating said air blower, an air conduit interconnecting said blower and said gas producer for supplying compressed air thereto, a gas conduit interconnecting said gas producer and said gas turbine for supplying operating gas thereto, and an auxiliary combustion chamber disposed within said gas conduit for heating the gas in said conduit before it enters said turbine.

5. In a hot gas producing and consuming plant, a gas producer, an air blower, a gas turbine operatively connected with and operating said air blower, an air conduit interconnecting said blower and said gas producer for supplying compressed air thereto, a gas conduit interconnecting said gas producer and said gas turbine for supplying operating gas thereto, an auxiliary combustion chamber disposed within said gas conduit for heating the operating gas for said turbine, a conduit interconnecting said air conduit and said gas conduit, and a valve means in each of said conduits for controlling the gas and air flow in said conduits.

6. In a hot gas producing and consuming plant, a gas producer, an air blower, a gas turbine operatively connected with and operating said air blower, an air conduit interconnecting said blower and said gas producer for supplying compressed air thereto, an auxiliary combustion chamber disposed within said air conduit for heating the compressed air in said conduit, a gas conduit interconnecting said gas producer and said gas turbine for supplying operating gas thereto, an auxiliary combustion chamber disposed within said gas conduit for heating the operating gas for said turbine, a conduit interconnecting said air conduit and said gas conduit, and a valve means in each of said conduits for controlling the gas and air flow in said conduits.

WALTER GUSTAV NOACK.